United States Patent [19]

Farrow

[11] 4,039,041
[45] Aug. 2, 1977

[54] FLUID PRESSURE BRAKING SYSTEMS FOR VEHICLES

[75] Inventor: Robert Michael Farrow, Leamington Spa, England

[73] Assignee: Automotive Products Company Limited, Leamington Spa, England

[21] Appl. No.: 675,948

[22] Filed: Apr. 12, 1976

[30] Foreign Application Priority Data

Apr. 14, 1975  United Kingdom ............... 15285/75

[51] Int. Cl.² .............................................. B60T 8/24
[52] U.S. Cl. ..................................... 180/104; 188/192; 280/88
[58] Field of Search .................. 280/88, 760; 188/192, 188/152; 180/103 BF, 104

[56] References Cited

U.S. PATENT DOCUMENTS

| | | | |
|---|---|---|---|
| 2,152,123 | 3/1939 | Williams | 188/152 |
| 3,706,352 | 12/1972 | Ferguson | 180/103 BF |
| 3,719,246 | 3/1973 | Bott | 180/103 BF |
| 3,752,251 | 8/1973 | Gaeke | 180/104 |
| 3,888,328 | 6/1975 | Leiber | 180/103 BF X |

Primary Examiner—Philip Goodman
Assistant Examiner—Terrance L. Siemens
Attorney, Agent, or Firm—Lawrence J. Winter

[57] ABSTRACT

A liquid pressure braking system for a vehicle has a master cylinder which is connected to the brake operating motor cylinder on each front wheel of the vehicle through a respective liquid pressure intensifier. Each intensifier has a differential area piston. The differential liquid pressure on the piston, which tends to close the valve and render the intensifier effective to increase the liquid pressure at its outlet as compared with its liquid pressure inlet, is opposed by a spring which reacts against a stepped plunger. The plunger projects towards a link 18 of a mechanism which interconnects suspension components of the two front wheels. Load transfer from the inboard front wheel during cornering increases the spring load applied to the piston of the intensifier that controls the supply of liquid pressure to that front wheel so that the valve of that intensifier remains open after closure of the valve of the other intensifier and the brake pressure that acts on that inboard front wheel is lower than the brake pressure that acts on the outboard front wheel.

9 Claims, 12 Drawing Figures

FLUID PRESSURE BRAKING SYSTEMS FOR VEHICLES

This invention relates to fluid pressure braking systems for vehicles.

According to this invention there is provided a fluid pressure braking system for a vehicle which includes a driver controlled source of liquid pressure, a first liquid pressure control device for controlling the pressure that acts in a first liquid pressure motor cylinder to apply a brake to a first wheel which is on one side of the vehicle, a second liquid pressure control device for controlling the pressure that acts in a second liquid pressure motor cylinder to apply a brake to a second wheel which is on the other side of the vehicle, and control means which are responsive to conditions which are indicative of load transfer from one of said wheels to the other and which are operable to modify the performance of one of said liquid pressure control devices in response to such conditions so that any pressure which acts in the other liquid pressure motor cylinder to apply the brake to the other of said wheels is higher than any pressure which acts in said one liquid pressure motor cylinder to apply the brake to said one wheel, wherein each liquid pressure control device is a liquid pressure intensifier.

The preferred form of liquid pressure intensifier comprises a chamber which is in communication with a respective liquid pressure motor cylinder, which is operable to apply the brake to the respective wheel, and which has a movable wall, valve means which operate under certain operating conditions to isolate said chamber from the driver controlled source of liquid pressure and biassing means for exerting a biassing force on said movable wall, the control means being operable to permit operation of said valve means to isolate said chamber from the driver controlled source of liquid pressure and to vary the effect of said biassing force on said movable wall with consequent variation in the liquid pressure that acts in said chamber and in the associated liquid pressure motor cylinder when said chamber is isolated from the driver controlled source of liquid pressure. The chamber may be annular, being defined within a larger diameter portion of a stepped bore and around a smaller diameter portion of a stepped piston which slides within the stepped bore.

Operation of the preferred form of liquid pressure intensifier valve device is unaffected by the adjustment of the brake of the vehicle because the stepped piston of the intensifier valve device does not move axially to increase the pressure of liquid in the associated motor cylinders as compared with the pressure of the source until sufficient pressure has been generated within the motor cylinders for the brake pads or the brake shoes to be brought into contact with the associated brake disc or brake drum.

Several embodiments of this invention will be described now by way of example with reference to the accompanying drawings, of which.

Figure 1:
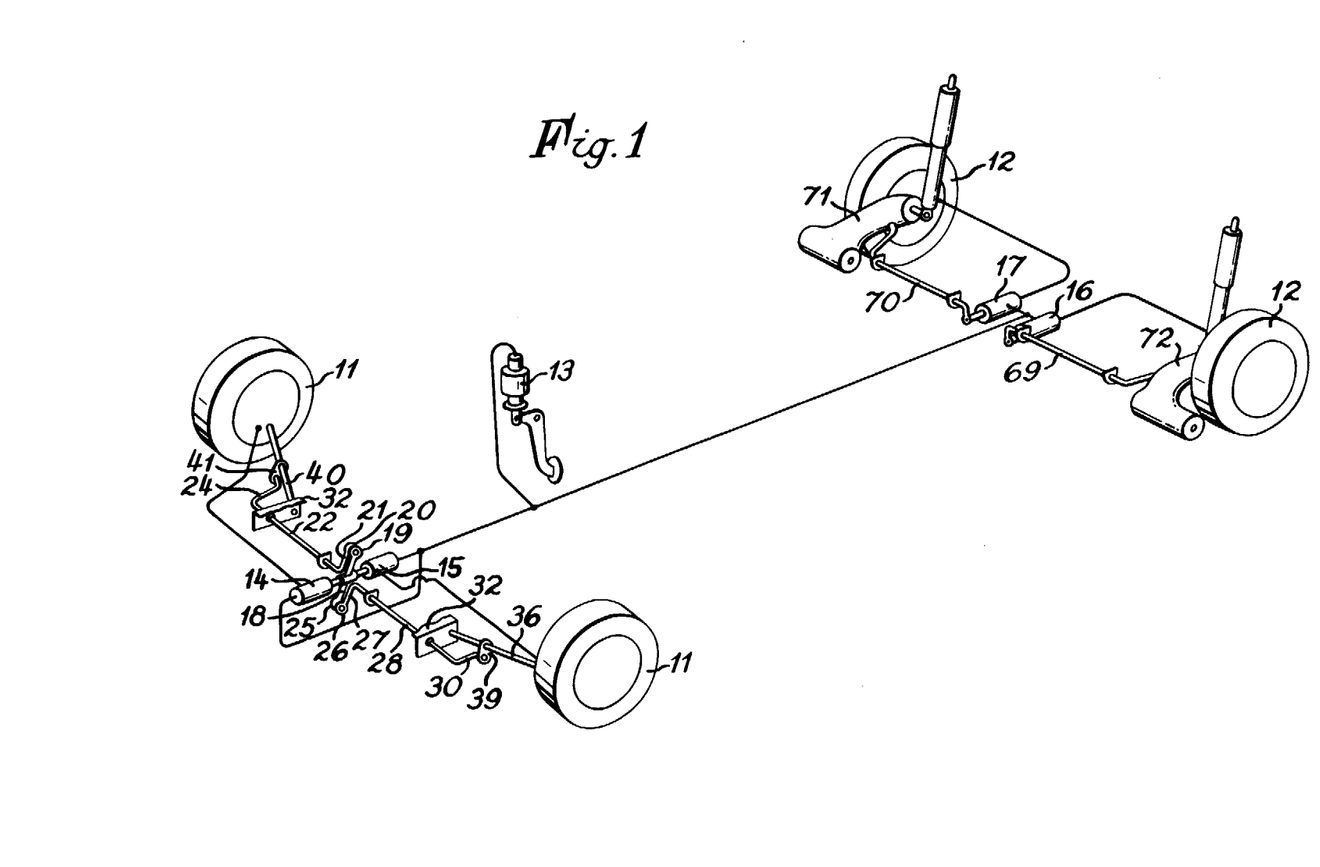
FIG. 1 is a diagrammatic representation in perspective of one form of liquid pressure braking system according to this invention.

In the liquid pressure braking system shown in FIG. 1, each of the motor cylinders (not shown) in which liquid pressure acts to apply brakes to each front wheel 11 or to each rear wheel 12 of the vehicle is connected to a liquid pressure master cylinder 13 through a respective valve device 14, 15, 16 or 17 which controls the liquid pressure which acts within the respective motor cylinder.

The two valve devices 14 and 15, which control liquid pressure which acts within the respective motor cylinders to apply brakes to the front wheels 11 of the vehicle, are coupled to a link 18. One end 19 of the link 18 is pinned to an end 20 of an arm 21 which projects from one end of a torsion bar 22 which is supported upon the vehicle body by spaced supports for rotation about its own longitudinal axis. The arm 21 is normal to the torsion bar 22 and to another arm 24 which projects from the other end of the torsion bar 22 and which is normal to the torsion bar 22 as well. The other end 25 of the link 18 is pinned to an end 26 of an arm 27 which projects from one end of another torsion bar 28 which is supported upon the vehicle body by spaced supports for rotation about its own longitudinal axis. The arm 7 is normal to the torsion bar 28 and to another arm 30 which projects from the other end of the torsion bar 28 and which is normal to the torsion bar 28 as well. The two arms 24 and 30 extend from the torsion bars 22 and 28 in the same direction. The torsion bars 22 and 28 are coaxial.

Figure 2:
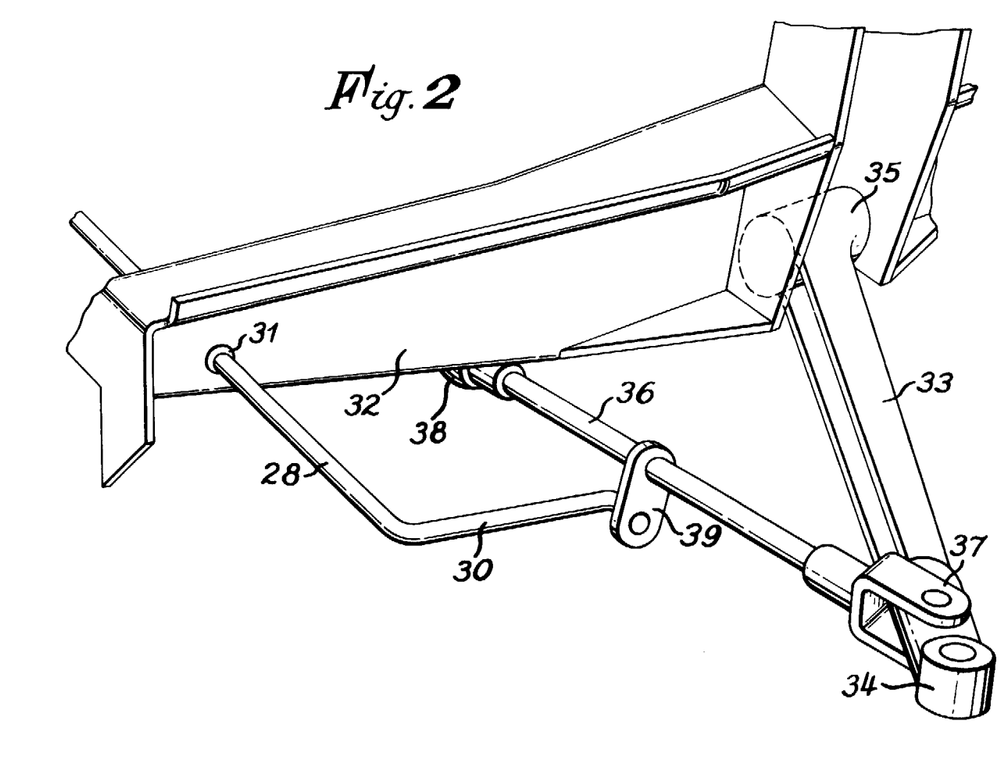
FIG. 2 is a fragmentary view in perspective showing part of the control mechanism for one of the valve devices of the liquid pressure braking system shown in FIG. 1.

FIG. 2 shows that a bearing support 31 for the torsion bar 28 is defined by a part of the vehicle body frame 32. A suspension arm 33 has an outboard end 34, which is apertured to receive the ball pin of a ball and socket joint by which it is joined to the hub of the adjacent front wheel 11, and an inboard end 35 which is pinned to the body frame 32 so that the arm 33 can pivot thereabout with up and down movement of the adjacent front wheel relative to the vehicle body. A tie rod 36 has a clevis 37 at one end, by which it is pinned to the suspension arm 33 adjacent the apertured outboard end 34, and extends forwards from the suspension arm 33 to its other end 38 which is mounted pivotally upon the body frame 32. A connector 39 interconnects the tie rod 36 and the end of the arm 30 remote from the torsion bar 28 so that that end of the arm 30 follows up and down movement of the tie rod 36 with up and down movement of the adjacent front wheel 11 relative to the vehicle body, the arm 30 being connected pivotally to the connector 39. The arm 30 moves angularly about the longitudinal axis of the torsion bar 28 with up and down movement of the adjacent front wheel 11 relative to the vehicle body.

A similar suspension arrangement, including a tie rod 40 (see FIG. 1), to that just described with reference to FIG. 2 is provided for supporting the vehicle body from the hub of the other front wheel 11. Another connector 41 is provided for interconnecting the tie rod 40 and the end of the arm 24 remote from the torsion bar 22. Thus the arm 24 moves angularly about the longitudinal axis of the torsion bar 22 with up and down movement of the adjacent front wheel 11 relative to the vehicle body.

Figure 3:
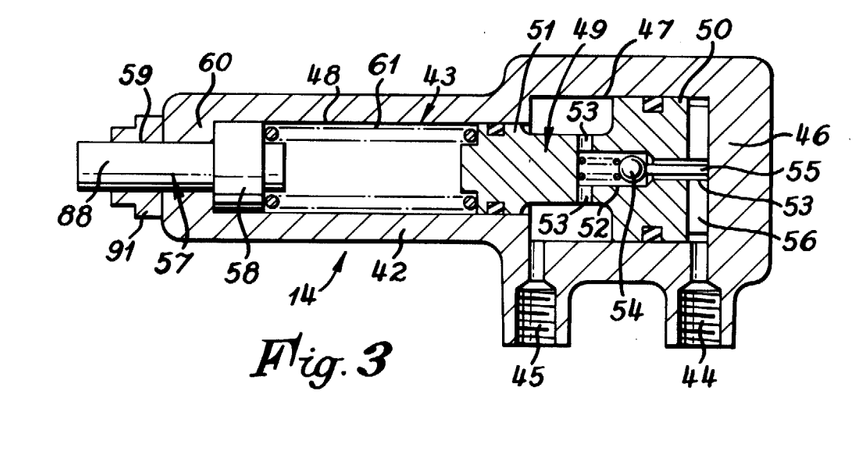
FIG. 3 is a diagrammatic transverse section of one form of valve device for the liquid pressure braking system shown in FIG. 1.

Referring now to FIG. 3, the valve device 14 comprises a body 42 which is mounted on the body of the vehicle and which defines a stepped cylindrical chamber 43, an inlet port 44 and an outlet port 45. The inlet port 44 is adjacent the larger diameter end wall 46 of the stepped cylindrical chamber 43 and the outlet port 45, which also communicates with the larger diameter portion 47 of the stepped cylindrical chamber 43, is adjacent the step between the larger diameter 47 and the smaller diameter portion 48 of the stepped cylindrical chamber 43.

A stepped piston 49 has a larger diameter portion 50 which slides within the larger diameter portion 47 of the stepped cylindrical chamber 43 and a smaller diameter portion 51 which slides within the smaller diameter portion 48 of the stepped cylindrical chamber 43. A chamber 52, which is defined within the stepped portion 49, communicates via radial passages 53 with the annular chamber that is defined around the smaller diameter piston portion 51 within the larger diameter portion 47 of the stepped cylindrical chamber 43 and between the larger diameter piston portion 50 and the step between the two portions 47 and 48 of the cylindrical chamber 43. An axial passage 54 extends from the chamber 52 to the end of the stepped piston 49 adjacent the larger diameter end wall 46. A ball 54 within the chamber 52 is spring urged towards a valve seat which surrounds the adjacent end of the axial passage 53 so that it closes the axial passage 53 when it is seated. An axial pin 55 projects from the larger diameter end wall 46 through the axial passage 55 and holds the ball 54 unseated when the stepped piston 49 abuts the larger diameter end wall 46. The larger diameter piston portion 50 is rebated at its end adjacent the larger diameter end wall 46 so that it defines an annular recess with which the inlet port 44 communicates when the piston 49 abuts the larger diameter end wall 46. Radial grooves 56 in the piston 49 place the axial passage 53 in communication with the said annular recess.

A plunger 57 has a head 58 which slides within the smaller diameter portion 48 of the stepped cylindrical chamber 43 and a smaller diameter stem 88 which projects through an aperture 59 in the smaller diameter end wall of the stepped cylindrical chamber 43. A coil spring 61 reacts against the head 58 of the plunger 57 to urge that plunger head 58 towards the smaller diameter end wall 60 and urges the stepped piston 49 towards the larger diameter end wall 46. The smaller diameter end wall 60 defines a cylindrical boss 91 which has a stepped outer surface and which is on the outer surface of the housing 42.

The construction of the valve device 15 is similar to that of the valve device 14 and will not be described herein in detail. Like parts of the two valve devices 14 and 15 will be identified by the same reference numerals in the following description. Each of the valve devices 14 and 15 is a liquid pressure intensifier which is arranged so that, when the liquid pressure which acts to apply brakes to the respective wheel reaches the level at which the liquid pressure loading on its stepped piston 49 overcomes a biassing load which urges that piston 49 towards the larger diameter end wall 46, the piston 49 moves away from the larger diameter end wall 46 and allows the ball 54 to seat so as to close the path of communication between the inlet port 44 and the outlet port 45. When the liquid pressure at the inlet port 44 is increased further by a small amount, the resultant axial movement of the piston 49 causes a greater increase in the liquid pressure at the outlet port 45. Hence the pressure at the outlet port 45, which is the pressure that acts to apply brakes to the respective wheel, increases at a higher rate than the source pressure once the ball 54 has been seated, the ratio of the pressure at the outlet port 45 plus a factor which corresponds to the rate of the coil spring 61 to the pressure at the inlet port 44 being that of the larger effective area of the downstream portion of the stepped piston 49 to the smaller upstream portion of that piston 49.

Figure 4:
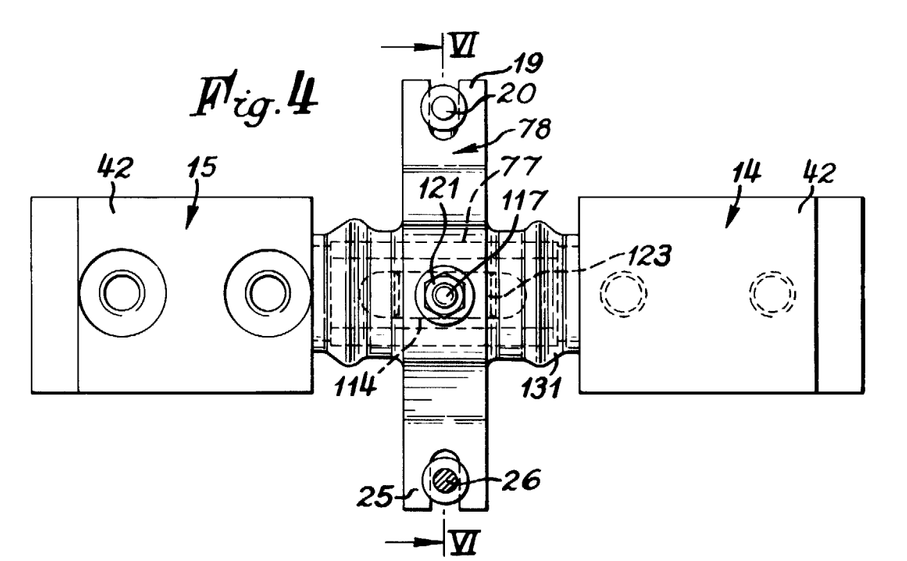
FIG. 4 is a side view mainly in elevation of the assembly of the two valve devices, which control liquid pressure which acts to apply brakes to the front wheels of the vehicle in the liquid pressure braking system shown in FIG. 1, and one form of control mechanism for those two valve devices.
Figure 5:
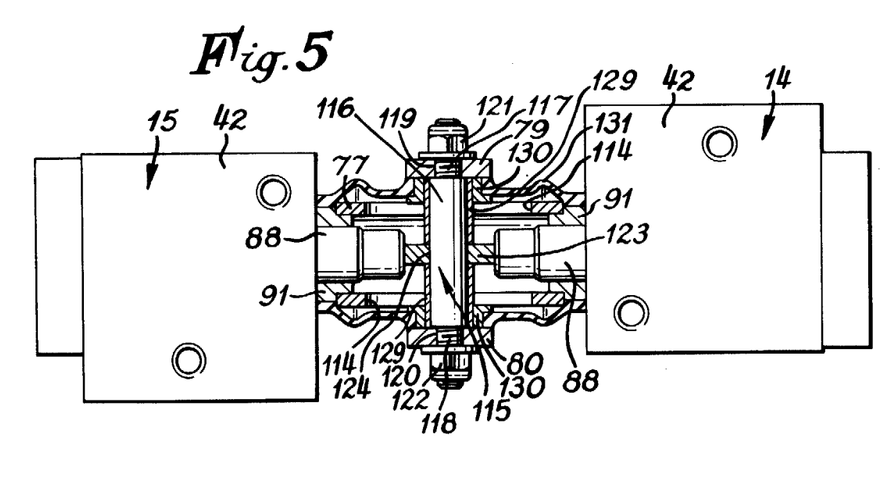
FIG. 5 is a sectional plan view of the assembly shown in FIG. 4, the two valve devices being shown in elevation for convenience.
Figure 6:
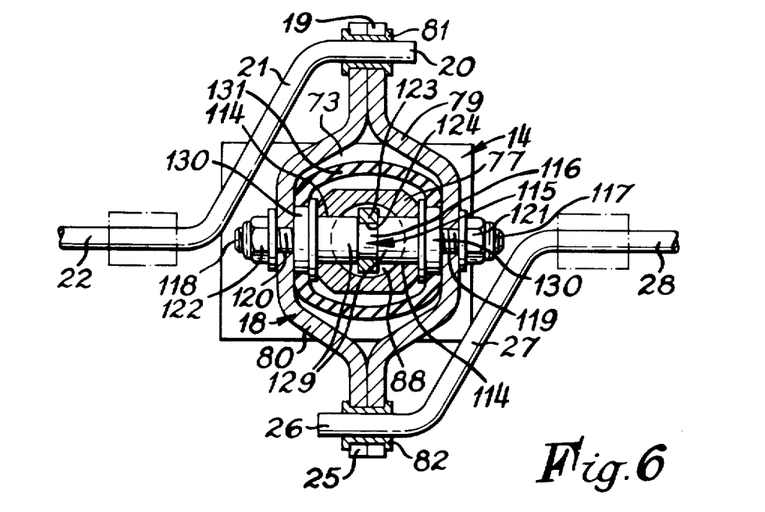
FIG. 6 is a section on the line IV—IV of FIG. 4.

FIGS. 4 to 6 illustrate the details of the assembly of the two valve devices 14 and 15 and of the link 18.

The assembly comprises a flatsided tubular crosshead 77 which connects the valve bodies 42 of the two valve devices 14 and 15 together and passes through a central aperture 73 defined by the link 18 which is composed of two cranked strips 79 and 80. The end portions of the two strips 79 and 80 are slotted. The end 20 of the arm 21 carries a shouldered bush 81 which is located within the slot that is formed at the end 19 of the link 78 by the respective slotted end portions of the strips 79 and 80. The end 26 of the arm 27 carries a shouldered bush 82 which is located within the slot that is formed at the other end 25 of the link 18 by the respective slotted end portions of the strips 79 and 80.

FIG. 5 shows that the cylindrical boss 91 of each valve device 14, 15 is spigotted into the respective open end of the tubular crosshead 77. The crosshead 77 has an opposed pair of elongate slots 114. A pivot pin 115 has a plain cylindrical central portion 116 which extends between the opposed midpoints of the two flat central portions of the cranked strips 79 and 80, passing through the opposed pair of elongate slots 114. A threaded stud 117, 118 projects coaxially from either end of the pivot pin central portion and passes through a respective plain hole 119, 120 formed at the centre of the adjacent cranked strip 79, 80. A self locking nut 121, 122 is screwed onto each threaded stud 117, 118 and holds the central portion of the respective cranked strip 79, 80 against the shoulder that is defined between that threaded stud 117, 118 and the cylindrical central portion 116 of the pivot pin 115.

An elongate flat plate 123 has a central aperture 124 into which the cylindrical central portion 116 of the pivot pin 115 is journaled. The plate 123 is substantially normal to the axis of the pivot pin 115 and is positioned substantially at the centre of the pivot pin 115. The arrangement is such that, when the pivot pin 115 is midway between the valve devices 14 and 15, each projecting plunger stem portion 88 is held against the plate 123 by the action of the respective coil spring 61 so that the stepped piston 49 of the valve device 14 is held against the respective end wall 46 by a thrust which is substantially the same as the thrust which holds the stepped piston 49 of the valve device 15 against the respective end wall 46.

That part of the cylindrical central portion 116 of the pivot pin 115 which extends between the elongate flat plate 123 and either of the cranked strips 79 and 80, is surrounded by a respective tubular spacer 129, the length of each spacer 129 being selected so that that spacer 129 is not loaded in compression by being clamped between the elongate plate 123 and the respective cranked strip 79, 80. Each spacer 129 is spigotted into a respective annular bush 130 which is located between the central portion of the respective cranked strip 79, 80 and the adjacent flat side surface of the tubular crosshead 77. A tubular flexible boot 131 surrounds the tubular crosshead 77 and has each of its ends located upon the cylindrical boss 91 of the respective valve device 14, 15. The annular bosses 130 project through the flexible boot 131 so that the cranked strips 79 and 80 of the locknuts 121 and 122 are outside the boot 131.

The control mechanism operates to increase the biassing load that acts to separate the ball 54 and its cooperating seat in the valve device 14, 15 that controls the liquid pressure that is fed to the inboard of the two front wheels 11 when the vehicle is driven round a bend or corner without changing the biassing load that acts to oppose closure of the valve device 14, 15 that controls the liquid pressure that is fed to the outboard of the two front wheels 11.

Figure 7:
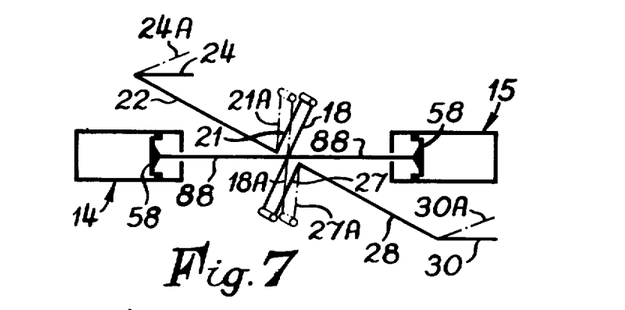
FIG. 7 is a diagram illustrating operation of part of the liquid pressure braking system illustrated in FIG. 1 when both front wheels pass over the same bump.

Referring to FIGS. 1 to 6 in conjunction with FIG. 7, when both front wheels 11 of the vehicle are driven over the same bump, or when the brakes are operated whilst the vehicle is being driven straight ahead so that the loading on the two front wheels 11 is increased substantially equally due to load transfer from the rear of the vehicle, the two arms 24 and 30 are deflected relative to the vehicle body through the same angle and in the same direction to, say, positions 24A and 30A respectively. At the same time arms 21 and 27 are rotated through the same angle and in the same sense to positions 21A annd 27A respectively. In consequence, the assembly of the link 18 and pivot pin 115 rotates about the axis of the pivot pin 115 relative to the elongate flat plate 123 without moving the elongate flat plate 123 so that the loading exerted upon the stepped piston 49 of each of the two valve devices 14 and 15 is not altered. Hence substantially the same liquid pressure is fed from the master cylinder 13 to each of the motor cylinders which operate brakes on the front wheels 11.

Figure 8:
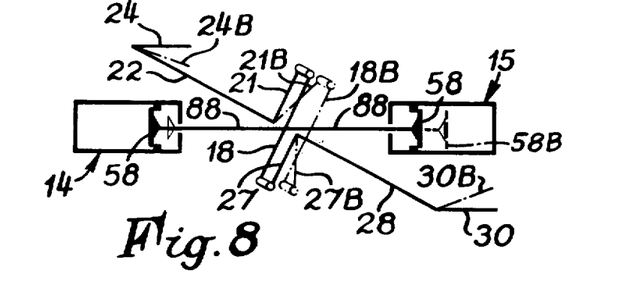
FIG. 8 is a diagram similar to FIG. 7 illustrating operation of that part of the liquid pressure braking system illustrated in FIG. 1 when the vehicle rolls about its longitudinal axis.

Referring now to FIGS. 1 to 6, in conjunction with FIG. 8, when the vehicle body rolls about its longitudinal axis, for example, when the vehicle is driven around a bend or a corner, so that the load carried by the outboard of the two front wheels is increased and the load carried by the inboard of the two front wheels is reduced, the two arms 24 and 30 are deflected relative to the vehicle body in opposite directions to, say, positions 24B and 30B respectively. For the convenience of this description it has been assumed that the valve device 14 controls the supply of liquid pressure to the motor cylinder that is operable to apply a brake to the outboard one of the two front wheels 11.

If the master cylinder 13 is operated to apply the brakes, the liquid pressure loading on each of the stepped pistons 49 acts in opposition to the respective coil spring 61 so that the effective force which opposes angular movement of the arms 21 and 27 with angular movement of the arms 24 and 30 is higher than is the case when the brakes are not applied. The torsional stiffness of the torsion bars 22 and 28 is sufficient to ensure that the arms 21 and 27 do move angularly to positions 21B and 27B with angular movement of the arms 24 and 30 when the brakes are applied. Angular movement of the arms 21 and 27 to positions 21B and 27B results in translational movement of the link 18 to the new position 18B, such movement being towards the valve device 15 that controls the liquid pressure that acts in motor cylinders to apply brakes to the inboard of the two front wheels 11.

Thus, when the vehicle rolls about its longitudinal axis, the pivot pin 115 is urged towards the valve device 15 which controls the supply of liquid under pressure to the motor cylinders which apply the brakes to the front wheel 11 that is subjected to the reduced loading. The force urging the pivot pin 115 in that direction is transmitted through the elongate flat plate 123 to the stepped piston 49 of that valve device 15 and applied to the stepped piston 49 to oppose the action of the liquid pressure loading which acts upon that piston 49 when the brakes are applied. Hence the ball 54 of the valve device 14 will seat before the ball 54 of the valve device 15 seats so that, once the ball 54 of the valve device 14 seats, the pressure of liquid fed to the motor cylinders that operate to apply brakes to the front wheel 11 that is subjected to the increased loading will be greater than the pressure of liquid that operates to apply brakes to the inboard front wheel 11 that is subjected to a reduced loading.

If the brakes are applied before the vehicle is driven into such a bend or corner, or if the vehicle is accelerated whilst it is being driven around such a bend or corner and the liquid pressure has been transmitted through both valve devices 14 and 15 and built up in the associated motor cylinders so that the brakes are applied to both front wheels 11, albeit so that the applied brake pressure acting on the outboard front wheel 11 is higher than that which acts on the inboard front wheel 11, the consequent movement of the torsion bars 22 and 28 results in the link 18 being moved towards the valve device 15 that controls the liquid pressure that acts in the motor cylinders to apply brakes to the inboard of the front wheels 11 so that the load that is applied to the stepped piston 49 of that valve device 15 via the respective coil spring 61 is increased. The stepped piston 49 of that valve device 14 is moved towards the respective larger diameter end wall 46 so that the pressure of liquid within the associated motor cylinders is reduced. The ball 54 of the valve device 15 functions to prevent the pressure of liquid in the associated motor cylinder being reduced much below master cylinder pressure.

When the vehicle body reassumes a level attitude, the link 18 is returned to its normal position and such return movement is accompanied by return movement of the plunger 57 of the valve device 15 under the influence of the respective coil spring 61.

It will be understood that when the vehicle is driven round a bend and the front wheel 11 that has its brake applied by a motor cylinder to which the supply of liquid pressure is controlled by the valve device 14 is the inboard front wheel 11 of the vehicle, the link 18 is moved towards the valve device 14. The coil spring 61 provide a force which tends to oppose rolling movement of the vehicle body away from the normal level attitude and which acts as a restoring force which tends to return the body to that position when the body has rolled. Hence the assembly which comprises the link 18 and the two valve devices 14 and 15 tends to act in the manner of a conventional anti-roll bar.

Each of the valve devices 16 and 17 which control liquid pressure which acts to apply brakes to each rear wheel 12 of the vehicle conveniently is a well known kind of pressure reducing valve which is arranged so that, when the liquid pressure that acts to apply brakes to the respective rear wheel 12 reaches the level at which the liquid pressure loading on a valve member overcomes a biassing load which urges that valve member towards an end wall of the valve body, that valve member moves to close a path of communication between the inlet port and the outlet port of the valve device 16, 17. When the liquid pressure at the inlet port of the valve device 16, 17 is increased further by a small amount, the differential liquid pressure loading on the valve member of the valve device 16, 17 is sufficient to re-open the path of communication through the valve device 16, 17. Hence the pressure at the outlet port of the valve device 16, 17, which is the pressure that acts to apply brakes to the respective rear wheel 12, increases at a lower rate than the source pressure once initial closure of the path of communication through the valve device 16, 17 has occurred. The valve member of each of the valve devices 16 and 17 is subjected to a biassing load which is independent of the biassing load exerted upon the other of the two valve devices 16 and 17. The biassing load, which acts upon the valve member of each of the valve devices 16 and 17 to hold it spaced from its associated valve seat is exerted by a respective torsion bar 69, 70 which has an arm at its other end coupled to a respective trailing suspension arm 72, 71 so that the arm at that other end of each torsion bar 69, 70 rotates about the longitudinal axis of that torsion bar 69, 70 with up and down movement of the adjacent rear wheel 12 relative to the adjacent rear wheel 112. Thus the biassing load which acts upon the valve member of each valve device 16, 17 is related to the load that is supported by the respective rear wheel 12 and each valve device 16, 17 acts as a pressure reducing valve in the manner described above so that, once the liquid pressure which acts to apply brakes to the respective rear wheel 12 has reached the level at which the liquid pressure loading on the valve member overcomes the biassing load, that liquid pressure increases at a lower rate than does master cylinder pressure.

The control mechanism for controlling the valve devices that control liquid pressure which acts within the respective motor cylinders to apply brakes to the front wheels 11 of the vehicle that have been described so far with reference to FIGS. 1 to 8 of the accompanying drawings include a link which is rotated idly about an axis when relative movement between the vehicle body and one of the front wheels 11 of the vehicle is substantially the same as the relative movement between the vehicle body and the other front wheel 11 of that vehicle. The forces that are transmitted to that link in response to the relative movement of the vehicle body and the front wheels 11 of the vehicle, when such relative movement between the body and one of the front wheels 11 is not the same as the relative movement between the vehicle body and the other front wheel of the vehicle, are applied to the link in the same sense so that the link itself is urged in that sense. The combined forces that are applied to the link in the latter circumstances are applied to the plunger 57 of the valve device 14, 15 that controls liquid pressure which is fed to the motor cylinder or cylinders that act to apply brakes to the front wheel 11 that is laden more lightly than the other front wheel 11. Those combined forces act to increase the biassing load that acts on that stepped piston 49 of that valve device 14, 15 so that the magnitude of the biassing load that opposes movement of that stepped piston 49 to close the path for flow of liquid through the valve device 14, 15 to the respective motor cylinder or cylinders is increased. Another form of control mechanism for effecting similar performance of the valve devices 14 and 15 which control liquid pressure which acts within the respective motor cylinder or cylinders to apply the brakes to the front wheels of the vehicle under like conditions will be described now with reference to FIGS. 9 and 10. This mechanism has been designed especially for ease of installation upon an existing motor car.

Figure 9:
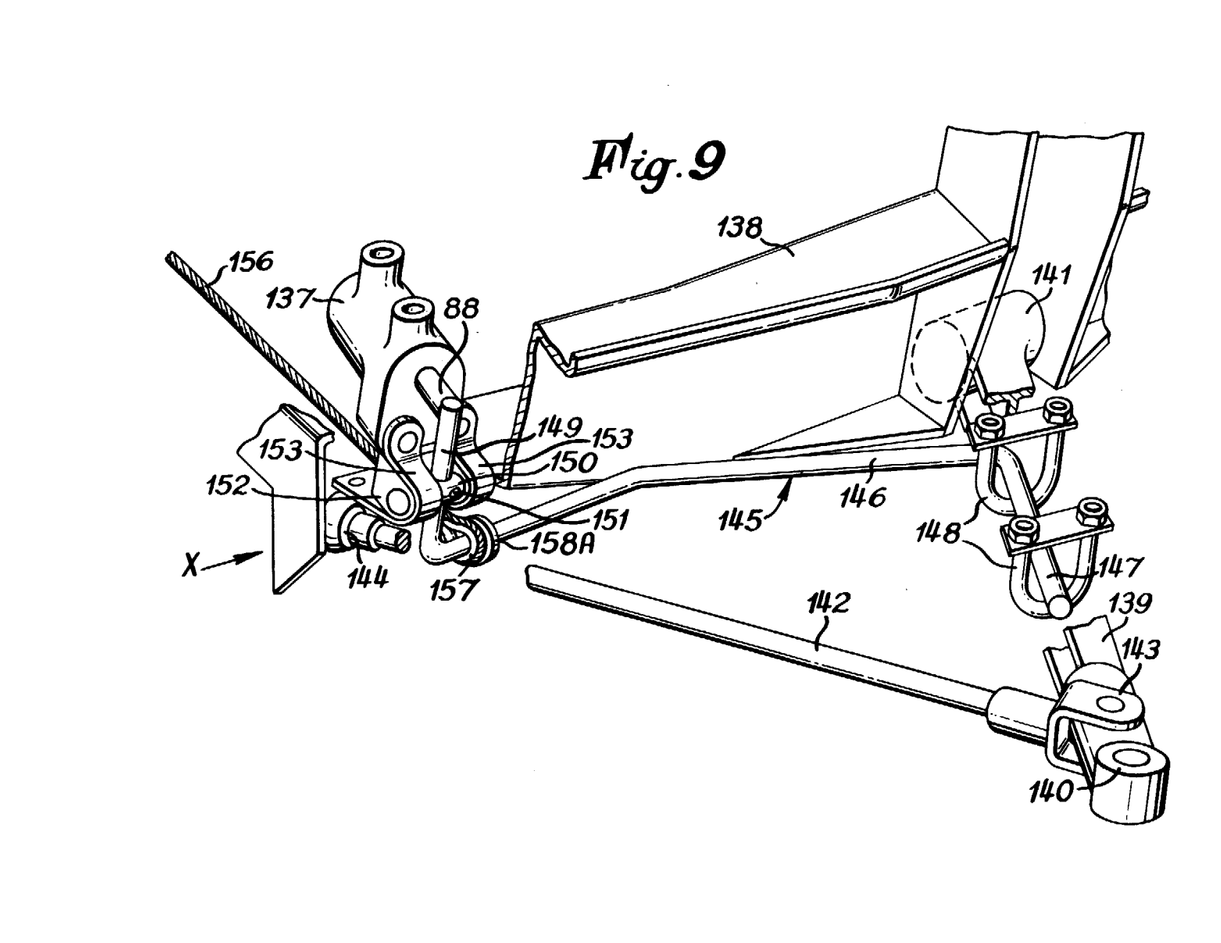
FIG. 9 is a view similar to FIG. 2 and illustrates another form of control mechanism for the valve device of another form of liquid pressure braking system according to this invention, the valve device being operable to control liquid pressure which acts to apply a brake to the respective one of the front wheels.
Figure 10:
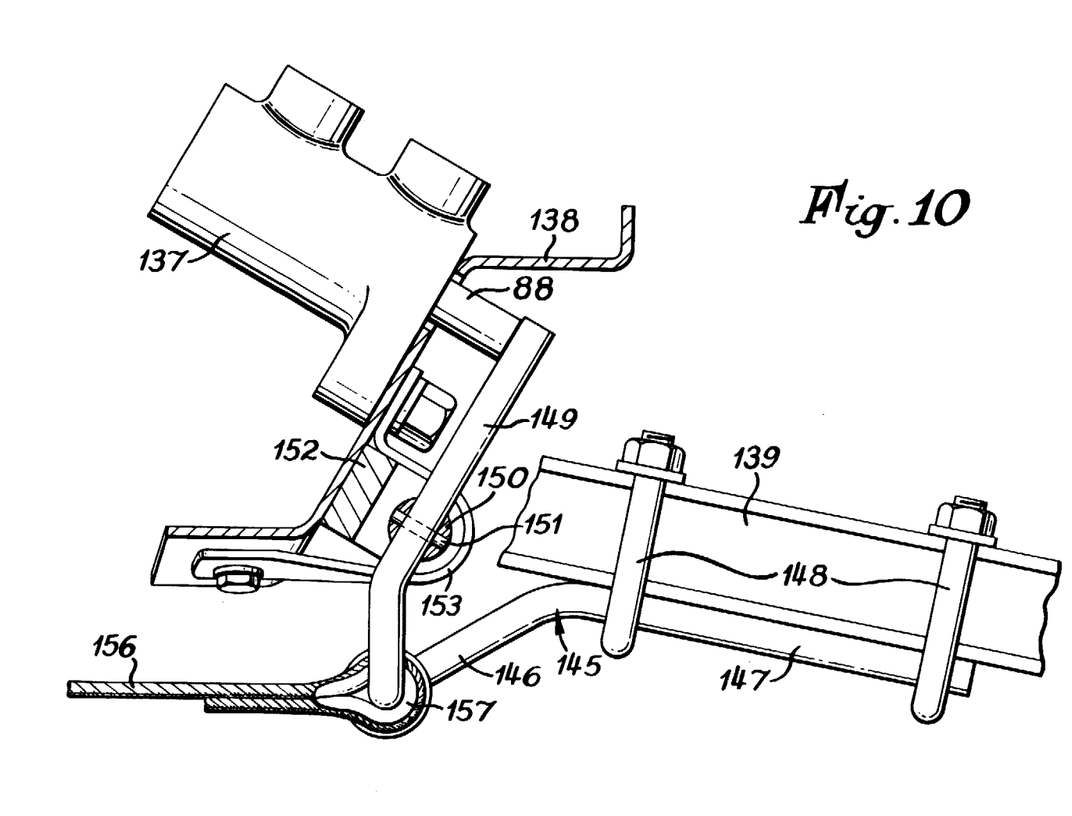
FIG. 10 is a partly sectional view of that part of the control mechanism shown in FIG. 9 as seen along arrow X in FIG. 9.

FIGS. 9 and 10 show the valve device 137, which controls liquid pressure which acts in motor cylinders to apply brakes to the right hand front wheel 11 of the motorcar, mounted on part of a body frame 138 at the left hand side of the motorcar, which is similar to the body frame 32 shown in FIG. 1. A suspension arm 139 has an outboard end 140, which is apertured to receive the ball pin of a ball and socket joint by which it is joined to the hub of the adjacent left front wheel 11, and an inboard end 141 which is pinned to the body frame 138 so that the arm 139 can pivot thereabout with up and down movement of the adjacent front wheel relative to the vehicle body. A tie rod 142 has a clevis 143 at one end, by which it is pinned to the suspension arm 139 adjacent the apertured outboard end 140, and extends forwards from the suspension arm 139 to its other end 144 which is mounted pivotally upon the body frame 138.

A torsion bar 145 has a cranked centre portion 146, a straight end arm 147, which is clamped to the underside of the suspension arm 139 by U bolts 148 and projects outwardly from one end of the centre portion 146, and an angled end arm 149 which projects substantially upwardly from the other end of the cranked centre portion 146. The outer limb of the angled arm 149 carries a pivot pin 150 which projects laterally from the arm 149 in both directions and which is fixed to the arm by a pin 151. The pivot pin 150 is supported for pivotal movement about its longitudinal axis by a D section bearing block 152 which is clamped to the body frame 138 below the valve device 137 by a pair of strip steel brackets 153 which are bolted to the body frame 138. The arm 149 extends through a slot in the D shaped bearing block 152, the dimensions of the slot being sufficient to allow angular movement of the pivot pin 150.

The internal construction of the valve device 14 which has been described above in detail with reference to FIG. 3 of the accompanying drawings. Corresponding parts of the valve devices 14 and 137 will be identified by the same reference numerals. The angled arm 149 of the torsion bar 145 abuts the plunger 57 of the valve device 14, 15.

A similar valve device 137A (not shown) controls liquid pressure which acts within the respective motor cylinder or cylinders to apply brakes to the left hand front wheel 11 of the motorcar. For convenience of description, the components of the control mechanism that are associated with the valve device 137A will be given the same numeral references as the corresponding parts shown in FIGS. 9 and 10 and they will be distinguishable from the corresponding parts shown in FIGS. 9 and 10 by the suffix 'A'. That other valve device 137A is mounted on a body frame 138A on the other side of the motorcar adjacent to the right front wheel 11 and is associated similarly with another cranked torsion bar 145 which is similar to the cranked torsion bar 145. It will be apparent that the assembly of the other valve device 173A, body frame 138A, torsion bar 145A and suspension arm 139A will look like the mirror image of the assembly shown in FIG. 10 when seen from the front of the motorcar.

A multi-strand wire cable 156 connects the two torsion bars 145 and 145A together. The cable 156 has an eye 157 at each end. That part of the cranked centre portion 146, 146A of each torsion bar 145, 145A which is next to the angled arm 149, 149A of that torsion bar 145, 145A passes through the respective eye 157. The eye 157 at each end of the cable 156 is restrained against movement away from the adjacent angled arm 149, 149A of the respective torsion bar 145, 145A by a respective collar 158A, 158AA which is fixed to the torsion bar 145, 145A. The cable 156 includes a suitable tensioning device (not shown), such as a screw type tensioner.

When the control mechanism has been assembled upon the car, the car is jacked up with both front wheels 11 hanging and the tensioning device carried by the cable 156 is adjusted until each angled arm 149, 149A just touches the adjacent plunger 57 but without exerting a force upon that plunger 57 sufficient to act in opposition to the spring loading exerted by the coil spring 61 of the respective valve device 137, 137A.

When both front wheels 11 of the vehicle are driven over the same bump, each suspension arm 139, 139A is pivoted upwards relative to the vehicle body frame 138, 138A about the pivot axis of the inboard end 141. The outer straight arm 147, 147A of each torsion bar 145, 145A is deflected with such pivotal movement of the respective suspension arm 139, 139A. Such deflection of the outer straight arm 147, 147A of both torsion bars 145 is accompanied by the application of a tensile load to the respective end of the cable 156, increasing the tension in that cable 156. The cable 156 is relatively rigid in tension so that it holds the engaged parts of the torsion bars 145, 145A and thereby restrains the angled arms 149, 149A of both torsion bars 145, 145A from moving angularly about the longitudinal axis of the respective pivot arm pin 150.

Thus the forces applied to the torsion bars 145, 145A by equal up and down movement of the front wheels 11 relative to the body of the motorcar, which are accompanied by like up or down deflection of the outer straight arms 147, 147A of each torsion bar 145, 145A result simply in torsional strain of the torsion bar 145, 145A without there being any angular movement of the inner angled arms 149 and 149A of the torsion bars 145 and 145A.

When the motorcar body rolls about its longitudinal axis, for example when the car is driven around a bend or corner, so that the load carried by the outboard of the two front wheels 11 is increased and the load carried by the inboard of the two front wheels 11 is reduced, the suspension arms 139, 139A pivot in opposite directions relative to the body frame 138, 138A. The inboard suspension arm 139, 139A pivots downwardly about the pivot axis of its inboard end 141, 141A whilst the outboard suspension arm 139, 139A pivots upwardly about its inboard pivot axis 141, 141A. The straight arm 147, 147A at the end of each torsion bar 145, 145A will be deflected pivotally with such pivotal movement of the respective suspension arm 139, 139A to which it is fixed. Thus the two torsion bars 145 and 145A tend to rotate in the same angular sense, each about the longitudinal axis of its respective pivot pin 150, 150A. The angled arm 149, 149A of the torsion bar 145, 145A on the inboard side of the motorcar moves away from the valve plunger 57 of the adjacent valve device 137, 137A. Thus the biassing load that acts within that valve device 137, 137A to hold the ball 54 unseated is unaltered. The angled arm 149, 149A of the torsion bar 145, 145A on the outboard side of the motorcar will be moved in the same angular sense as the angled arm 149, 149A of the inboard torsion bar 145, 145A. Such angular movement of the angled arm 149, 149A of the outboard torsion bar 145, 145A urges the plunger 57 of the adjacent valve device 15, towards the stepped piston 49 of that valve device 14, 15. Thus the biassing load that acts upon the stepped piston 49 of the valve device 137, 137A that controls liquid pressure which acts in the respective motor cylinder or cylinders to apply brakes to the inboard front wheel 11 of the motorcar is increased.

If the brakes are applied to the front wheels 11 before the vehicle is driven around a bend or corner and those brakes are held applied to those wheels whilst the vehicle is driven around that bend or corner, the angular movement of the angled arm 149, 149A of the outboard torsion bar 145, 145A urges the valve plunger 57 of the valve device 137, 137A, which controls liquid pressure fed to the motor cylinder or cylinders that operate to apply brakes to the inboard front wheel 11 of the motorcar, inwardly with respect to the body of that valve device 137, 137A and thus, providing that the liquid pressure which acts in the motor cylinder or cylinders to apply the brakes to that inboard front wheel 11 is high enough, reduces the liquid pressure that acts within the respective motor cylinder or cylinders to apply brakes to the inboard front wheel 11.

Thus the control mechanism for controlling the two valve devices 137, 137A which control liquid pressure which acts in the respective motor cylinder or cylinders to apply brakes to the front wheels 11 of the motorcar is arranged so that the two torsion bars 145, 145A are loaded additionally in torsion when the front wheels 11 rise together relative to the body of the motorcar because they are driven over the same bump. The additional torsional loads that are applied to the two torsion bars 145, 145A in such circumstances are equal in magnitude and opposite in sense and are reacted by an additional tensile load in the cable 156. Consequently no load is applied by either angled arm 149, 149A to the plunger 57 of the respective valve device 137, 137A. On the other hand, when movement of the motorcar body is such that relative movement between the body and one of the front wheels 11 is not the same as the relative movement between that body and the other front wheel 11, the torsional loads applied to the two torsion bars 145 and 145A are unequal in magnitude. The resultant out of balance torque causes the cable 156 to move along its length towards the valve device 137, 137A that controls liquid pressure that acts in the respective motor cylinder or cylinders to apply brakes to the inboard front wheel 11 of the motorcar. In such a circumstance the angled arm 149, 149A of the inboard torsion bar 145, 145A acts as a lever and urges the plunger 57 of the valve device 137, 137A which controls liquid pressure that acts in the respective motor cylinder or cylinders to apply brakes to the adjacent inboard front wheel 11 of the motorcar, towards the stepped piston 49 of that valve device 14, 15 in order to increase the biassing load which acts upon that stepped piston 49. Hence the out of balance torque is reacted by compression of the coil spring 61 of that valve device 14, 15.

Figure 11:
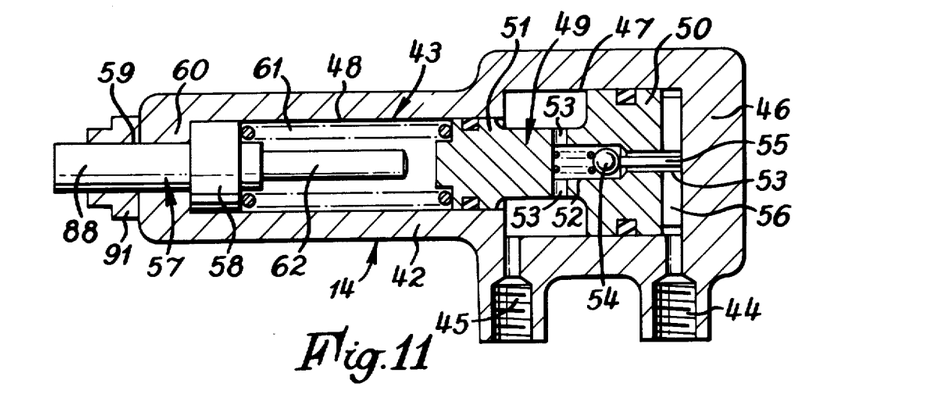
FIG. 11 is a diagram similar to FIG. 3 which illustrates a modified form of valve device for the liquid pressure braking system shown in FIG. 1.

FIG. 11 illustrates a modified form of the valve device 14 shown in FIG. 3. The modification comprises the provision of an axially extending post 62 on the plunger 57 which projects from the plunger head 58 towards the stepped piston 49. The length of the post 62 is insufficient for it to be abutted by the stepped piston 49 if the stepped piston 49 is moved towards the plunger 57 by the differential liquid pressure loading which acts thereon when the brakes are operated whilst the vehicle is being driven straight ahead so that the loading on the two front wheels 11 is increased substantially equally due to local transfer from the rear of the vehicle as described above with reference to FIG. 7. However the length of the post 62 is sufficient for the stepped piston 49 to be moved into contact with the post 62 if the brakes are applied whilst the vehicle is being driven around a bend or a corner of the appropriate hand so that the control mechanism urges the plunger 57 towards the stepped piston 49. Once the stepped piston 49 abuts the post 62 of the plunger 57, the effective resilient means which oppose further movement of the stepped piston 49 away from the larger diameter end wall 46 comprises the torsion bars of the control mechanism instead of the coil spring 61 of the valve device. Thus the rate of increase of the liquid pressure at the outlet 45 of the valve device 15 once the ball 54 has seated is less after the stepped piston 49 abuts the post 62 than before.

Figure 12:
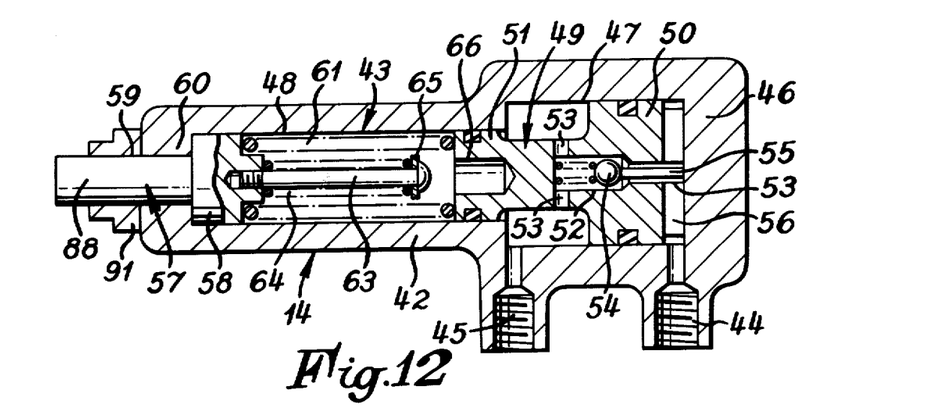
FIG. 12 is a diagram similar to FIG. 3 which illustrates another form of valve device for the liquid pressure braking system shown in FIG. 1.

FIG. 12 illustrates a further modification to the valve device 14. A setscrew 63 is screwed coaxially into the head 58 of the plunger 57 in place of the post 62. A second coil spring 64 reacts against the head 58 and urges a washer 65 against the head of the setscrew 63. The stepped piston 49 has an axial blind bore 66 extending inwards from its smaller diameter end face. The diameter of the blind bore 66 is greater than the outside diameter of the head of the setscrew 63 and less than the outside diameter of the washer 65. Like the post 62, the length of the setscrew 63 is such that the stepped piston 49 remains spaced from the washer 65 and the setscrew 63 when the brakes are applied whilst the vehicle is being driven straight ahead. If the brakes are applied whilst the vehicle is being driven around a bend or corner of the appropriate hand, the stepped piston 49 will first contact the washer 65 so that further movement of the stepped piston 49 towards the plunger 57 is opposed by both coil springs 61 and 64 until the head of the setscrew 63 abuts the blind end of the blind bore 66. Provision of the second coil spring 64 results in a gradual change in the rate of increase of the liquid pressure at the outlet 45 of the valve device 14 once the ball 54 has seated and the piston 49 has moved to contact the washer 65 than occurs in the valve device described above with reference to FIG. 11 when the stepped piston 49 abuts the post 62.

It is possible for the pressure of liquid in the associated motor cylinders to be reduced below master cylinder pressure when the vehicle is driven into a bend or corner with the brakes applied or when the vehicle is accelerated whilst being driven around a bend or corner with the brakes applied. This can be achieved by provision of a sufficiently preloaded spring which acts to seat the ball 54. Also this can be achieved by use of a valve which controls liquid flow fron one side to the other of the stepped piston and which is independent of the pressure on each side of the stepped piston.

I claim:

1. A fluid pressure braking system for a vehicle which includes a driver controlled source of liquid pressure, a first liquid pressure control device for controlling the pressure that acts in a first liquid pressure motor cylinder to apply a brake to a first wheel which is on one side of the vehicle, a second liquid pressure control device for controlling the pressure that acts in a second liquid pressure motor cylinder to apply a brake to a second wheel which is on the other side of the vehicle, and control means which are responsive to conditions which are indicative of load transfer from one of said wheels to the other and which are operable to modify the performance of one of said liquid pressure control devices in response to such conditions so that any pressure which acts in the other liquid pressure motor cylinder to apply the brake to the other of said wheels is higher than any pressure which acts in said one liquid pressure motor cylinder to apply the brake to said one wheel, wherein each liquid pressure control device is a liquid pressure intensifier.

2. A fluid pressure braking system as claimed in claim 1, wherein each liquid pressure intensifier comprises a chamber which is in communication with a respective liquid pressure motor cylinder, which is operable to apply the brake to the respective wheel, and which has a movable wall, valve means which operate under certain operating conditions to isolate said chamber from the driver controlled source of liquid pressure and biassing means for exerting a biassing force on said movable wall, the control means being operable to permit operation of said valve means to isolate said chamber from the driver controlled source of liquid pressure and to vary the effect of said biassing force on said movable wall with consequent variation in the liquid pressure that acts in said chamber and in the associated liquid pressure motor cylinder when said chamber is isolated from the driver controlled source of liquid pressure.

3. A fluid pressure braking system as claimed in claim 2, wherein the chamber of each liquid pressure intensifier is annular, being defined within a larger diameter portion of a stepped bore and around a smaller diameter portion of a stepped piston which slides within the stepped bore.

4. A fluid pressure braking system as claimed in claim 3, wherein the biassing means of each liquid pressure intensifier include resilient means which act upon the smaller diameter piston portion and react against a movable abutment, the movable abutment being movable by operation of the control means in response to such load transfer to the appropriate wheel, the effect of said biassing force on the piston being varied by movement of the movable abutment and the biassing force acting on the piston to urge the piston in the appropriate direction to maximise the volume of said annular chamber.

5. A fluid pressure braking system as claimed in claim 4, wherein the movable abutment of each fluid pressure intensifier is a plunger which slides within the respective smaller diameter bore portion and passes through an aperture at the end of the respective smaller diameter bore portion remote from the respective stepped piston.

6. A fluid pressure braking system as claimed in claim 5, wherein each stepped bore is formed in a valve body which is mounted on a body of the vehicle and the respective plunger is linked to a component of the vehicle suspension system which moves with relative movement between the vehicle body and the appropriate wheel of the vehicle.

7. A fluid pressure braking system as claimed in claim 6, wherein the resilient means comprise a coil spring and the plunger has a rigid axial projection which extends towards the respective stepped piston, the length of the rigid projection and the loading of the coil spring being such that the stepped piston remains spaced from the rigid axial projection when the brakes are applied and the loading on said first wheel is substantially the same as the loading on the second wheel, whilst the stepped piston can be moved by the liquid pressure loading thereon into abutment with the rigid axial projection when the brakes are applied and the plunger is urged towards the stepped piston by the control means in response to load transfer from the respective one of said first and second wheels to the other wheel.

8. A fluid pressure braking system as claimed in claim 7, wherein each plunger carries a spring loaded abutment which is adapted to be abutted by the respective stepped piston before the stepped piston abuts the rigid axial projection.

9. A fluid pressure braking system according to claim 6, wherein the first liquid pressure intensifier has its plunger linked to a component of that part of the suspension system by which the vehicle body is supported upon the second wheel and the second liquid pressure intensifier has its plunger linked to a component of that part of the suspension system by which the vehicle body is supported upon the first wheel.

* * * * *